US009640056B2

United States Patent
Yi

(10) Patent No.: US 9,640,056 B2
(45) Date of Patent: May 2, 2017

(54) METHOD FOR SENSING EMERGENCY IN RESPONSE TO PHYSICAL AND MENTAL SHOCK AND APPARATUS FOR SENSING EMERGENCY USING THE METHOD

(71) Applicant: Dongwon Yi, Seoul (KR)

(72) Inventor: Dongwon Yi, Seoul (KR)

(*) Notice: Subject to any disclaimer, the term of this patent is extended or adjusted under 35 U.S.C. 154(b) by 0 days.

(21) Appl. No.: 15/211,007

(22) Filed: Jul. 15, 2016

(65) Prior Publication Data

US 2016/0328940 A1 Nov. 10, 2016

(30) Foreign Application Priority Data

Feb. 19, 2014 (KR) .................. 10-2014-0019334

(51) Int. Cl.
*G08B 21/04* (2006.01)
*H04N 7/18* (2006.01)

(52) U.S. Cl.
CPC .......... *G08B 21/043* (2013.01); *H04N 7/188* (2013.01)

(58) Field of Classification Search
CPC ........ G08B 21/22; G08B 25/14; G08B 25/10; G08B 3/10; G08B 23/00; G06Q 10/08; A61B 5/0002; B60R 25/102; G10H 1/16
USPC ...... 340/573.1, 539.13, 539.12, 539.22, 989, 340/540, 506, 517, 901, 903, 436, 425.5; 381/61; 701/301
See application file for complete search history.

(56) References Cited

U.S. PATENT DOCUMENTS

| 6,339,370 | B1* | 1/2002 | Ruhl | G08G 1/205 340/435 |
| 7,508,298 | B2* | 3/2009 | Pisz | G08B 25/001 340/436 |
| 8,063,764 | B1* | 11/2011 | Mihailidis | G08B 21/043 340/506 |
| 8,620,256 | B2* | 12/2013 | Stahlin | G08B 25/012 455/404.1 |
| 2007/0075919 | A1* | 4/2007 | Breed | B60R 21/013 345/8 |
| 2011/0013337 | A1* | 1/2011 | Brown | F41H 5/08 361/232 |
| 2012/0050034 | A1* | 3/2012 | Hushek | G08B 3/1008 340/539.13 |
| 2012/0256769 | A1* | 10/2012 | Satpathy | G08B 13/19647 340/989 |

(Continued)

FOREIGN PATENT DOCUMENTS

JP 2003-219061 A 7/2003
KR 10-2000-0071297 A 11/2000

(Continued)

*Primary Examiner* — George Bugg
*Assistant Examiner* — Munear Akki
(74) *Attorney, Agent, or Firm* — Novick, Kim & Lee, PLLC; Jae Youn Kim

(57) ABSTRACT

Disclosed are a method for sensing an emergency in response to a physical shock and a mental shock and an apparatus using the method. According to the method, whether a person is in an emergency state is determined by analyzing the physical shock and mental shock applied to the person and the emergency is automatically sensed without any effort on the part of the victim, whereby the rate at which an emergency is sensed in real time may be increased and the incidence of false determination on the emergencies may be reduced.

5 Claims, 3 Drawing Sheets

(56) References Cited

U.S. PATENT DOCUMENTS

| | | | | |
|---|---|---|---|---|
| 2013/0088351 A1* | 4/2013 | Kim | ............... | G08B 25/08 340/539.22 |
| 2013/0194087 A1* | 8/2013 | Tomer | ............... | G08G 1/205 340/436 |
| 2013/0234851 A1* | 9/2013 | Amis | ............... | G08B 15/001 340/539.13 |
| 2013/0339019 A1* | 12/2013 | Giancarlo | ............... | G10L 15/04 704/251 |
| 2014/0118144 A1* | 5/2014 | Amis | ............... | G08B 21/02 340/540 |
| 2015/0130613 A1* | 5/2015 | Fullam | ............... | G08B 21/0453 340/539.12 |
| 2015/0317801 A1* | 11/2015 | Bentley | ............... | H04N 7/181 382/107 |
| 2015/0332580 A1* | 11/2015 | Bokhary | ............... | G08B 25/016 340/539.13 |

FOREIGN PATENT DOCUMENTS

| | | |
|---|---|---|
| KR | 10-2011-0067416 A | 6/2011 |
| KR | 10-1125487 B1 | 3/2012 |
| KR | 20-0463036 Y1 | 10/2012 |
| KR | 10-2013-0083035 A | 7/2013 |

\* cited by examiner

|  |  |  | PRECEDING EMERGENCY FACTOR ||||||||
|  |  |  | IMPACT ACCELERATION G ||||| SOUND |||
|  |  |  | ABOVE 30 | 30~10 | 10~4 | 4~1 | BELOW 1 | ABOVE 100 dB | SOS | etc. |
| FOLLOWING EMERGENCY FACTOR (consecutive occurrence within 30 seconds) | IMPACT ACCELERATION G | ABOVE 30 | ★★★★ | ★★★★ | ★★ | ★★ | ★★ | ★★★★ | ★★★★ | ★★ |
| | | 30~10 | ★★★★ | ★★★★ | ★★ | ★★ |  | ★★ | ★★ |  |
| | | 10~4 |  |  |  |  |  | ★★ | ★★ |  |
| | | 4~1 | ★★ | ★★ |  |  |  | ★★ | ★★ |  |
| | | BELOW 1 | ★★★★ | ★★★★ | ★★★★ |  |  | ★★★★ | ★★★★ |  |
| | SOUND dB | ABOVE 100 dB | ★★★★ | ★★★★ | ★★★★ |  |  | ★★★★ | ★★★★ | ★★ |
| | | SOS | ★★★★ | ★★★★ | ★★★★ |  |  | ★★★★ | ★★★★ | ★★ |
| | | etc. |  |  |  |  |  |  |  |  |

★★★★ : MAJOR EMERGENCY
★★ : POTENTIAL EMERGENCY

FIG. 2

METHOD FOR SENSING EMERGENCY IN RESPONSE TO PHYSICAL AND MENTAL SHOCK AND APPARATUS FOR SENSING EMERGENCY USING THE METHOD

STATEMENT REGARDING PRIOR DISCLOSURES

Korean Application No. 10-2014-0019334 which was filed on Feb. 19, 2014, and published on Aug. 28, 2015, as Korean Patent Publication 10-2015-0098288, has the same inventorship as the present application and does not qualify as prior art under AIA 35 U.S.C. 102(b)(1)(A).

BACKGROUND OF THE INVENTION

Field of the Invention

The present invention relates generally to an apparatus for sensing an emergency in response to a physical shock and a mental shock and a method for sensing an emergency using the apparatus. More particularly, the present invention relates to a method for sensing an emergency in response to a physical shock and a mental shock and an apparatus for sensing an emergency using the method, in which whether a person is in an emergency state is detected by analyzing a physical shock and a mental shock applied to the person, an emergency is automatically and correctly sensed without any effort on the part of a victim when the emergency occurs, whereby the rate at which an emergency is sensed in real time is increased and the incidence of false determination on the emergencies is reduced.

Description of the Related Art

These days, violent crimes against children, women, and elderly people happen frequently, and the risk thereof is very serious. Accordingly, various kinds of products for personal safety have been released.

Most of these products use existing communication terminals in such a way that a victim operates an emergency call function using a communication terminal, or after an emergency is sensed using a removable device, such as a Radio Frequency Identification (RFID) device, the emergency is reported using the existing communication terminal owned by a victim.

However, when weak and elderly people, who are poor at determination and self-defense capability, carry expensive high-tech smart phones, the people may be subjected to the harm and threat of robbery. Also, because smart devices, such as smart phones, may be stored in pockets or bags due to the weight and volume thereof, or because it may be difficult to capture images using the devices in an overwhelming situation, a method using smart devices has a limitation in sensing and reporting an emergency.

Also, a method using a removable device such as an RFID device is a problematic in that it is inconvenient to attach the device and that it is difficult to detect an emergency when the RFID device is stored in a pocket because the RFIDs are required to be isolated in order to detect an emergency but they are not isolated in the pocket.

Meanwhile, Korean Patent Application Publication No. 10-2000-0071297, titled "Emergency reporting system and terminal apparatus therein", discloses an emergency reporting apparatus for a vehicle, including a communication device, in which, when an emergency occurs in the vehicle, the communication device is used to report the emergency to an emergency report reception center, and a user is informed of the state of operation of the communication device when the communication device is used to report the emergency, wherein the communication device may include a radio communication function.

However, because this conventional emergency sensing system is installed in a vehicle, a traffic accident is designated as an emergency situation. Accordingly, the technical solution is concentrated on responding to traffic accidents.

The foregoing is intended merely to aid in the understanding of the background of the present invention, and is not intended to mean that the present invention falls within the purview of the related art, which is already known to those skilled in the art.

DOCUMENTS OF RELATED ART (Patent Document 1) Korean Patent Application Publication No. 10-2000-0071297.

SUMMARY OF THE INVENTION

Accordingly, the present invention has been made keeping in mind the above problems, and an object of the present invention is to provide an apparatus for sensing an emergency in response to a physical shock and a mental shock and a method for sensing an emergency using the apparatus, in which whether a person is in an emergency state is detected by analyzing the physical and mental shock applied to the person, an emergency is automatically and correctly sensed without any effort on the part of a victim when the emergency occurs, whereby the rate at which an emergency is sensed in real time is increased and the incidence of false determination of emergencies is reduced.

In order to achieve the above object, an apparatus for sensing an emergency according to the present invention includes an impact acceleration sensor module for measuring the degree of physical shock applied to a body; a physical shock data conversion module for receiving output from the impact acceleration sensor module and converting the level of shock per unit time into a level of physical shock; a sound sensor module for receiving sound or voice for measuring the level of mental shock; a mental shock data conversion module for converting the sound or voice, input from the sound sensor module, into the level of mental shock by analyzing a decibel level of the input sound or voice or by checking whether a waveform of the input sound or voice is identical to that of a keyword registered in advance; a combined shock data conversion module for acquiring a combined shock level by analyzing dynamics such as an order in which the physical shock and the mental shock occur, a change in intensity of the physical shock and the mental shock, and the like; an emergency determination module for determining whether or not an emergency exists depending on whether the level of physical shock, the level of mental shock, or the combined shock level is equal to or greater than a reference value; an alarm module for outputting an emergency signal when the emergency determination module determines that an emergency exists; and a data storage module for storing the level of physical shock, the time at which the physical shock occurred, the level of mental shock, the time at which the mental shock occurred, the combined shock level, sound data, and GPS data.

In an embodiment, the physical shock data conversion module may be configured to convert a measured impact acceleration into the level of physical shock in life, which is one of a shock level corresponding to a large shock beyond a fall, a shock level corresponding to pushing strongly and instantly, a shock level corresponding to fast running, a shock level corresponding to walking or being dragged, and a shock level corresponding to being nearly motionless.

In an embodiment, the mental shock data conversion module may be configured to convert the decibel level measured by the sound sensor module into the level of mental shock, which is one of a shock level corresponding to a cry, a shock level corresponding to a cry of a baby, and a shock level at which sending an SOS is necessary, and to convert the input voice into the level of mental shock by checking whether the waveform of the input voice is identical to that of a keyword registered in advance, such as "Oh, my", "Freeze", "Follow me", "Give me the money", or the like.

In an embodiment, the combined shock data conversion module may be configured to calculate the combined shock level in order to correctly determine whether an emergency exists because the determination may differ depending on the physical condition of the person who receives the physical shock even if an identical shock is applied, and to calculate the combined shock level by analyzing dynamics, such as the order in which the physical shock and the mental shock occur and the change in the intensity of the physical shock and the mental shock, in conjunction with behavioral science.

Another aspect of the present invention is implemented as a method for sensing an emergency in response to a physical shock and a mental shock, the method using an impact acceleration sensor module for measuring the degree of physical shock applied to a body, a physical shock data conversion module for receiving output from the impact acceleration sensor module and converting the degree of shock per unit time to a level of physical shock, a sound sensor module for receiving sound or voice for measuring a level of mental shock, a mental shock data conversion module for converting the sound or voice, input from the sound sensor module, into the level of mental shock by analyzing the decibel level of the input sound or voice or by checking whether a waveform of the input sound or voice is identical to that of a keyword registered in advance, a combined shock data conversion module for acquiring a combined shock level by analyzing dynamics such as an order in which the physical shock and the mental shock occur, a change in intensity of the physical shock and the mental shock, and the like, an emergency determination module for determining whether an emergency exists depending on whether the level of physical shock, the level of mental shock, or the combined shock level is equal to or greater than a reference value, an alarm module for outputting an emergency signal when the emergency determination module determines that an emergency exists, and a data storage module for storing the level of physical shock, the time at which the physical shock occurred, the level of mental shock, the time at which the mental shock occurred, the combined shock level, sound data, and GPS data. The method includes continuously collecting the physical shock level, the mental shock level, and the combined shock level from the physical shock data conversion module, the mental shock data conversion module, and the combined shock data conversion module at regular intervals; determining whether an emergency exists depending on whether the physical shock level, the mental shock level, or the combined shock level is equal to greater than a reference value; when it is determined that an emergency exists at the determining, activating a camera and a microphone in order to check a situation at a site; generating image data from images captured by the camera and generating sound data from sound recorded by the microphone if a configuration value set in advance is set to multimedia file transmission; transmitting the generated image data and the generated sound data into a preset location; and transmitting video data generated using the camera and the microphone into the preset location in real time if the configuration value set in advance is set to real-time video transmission.

BRIEF DESCRIPTION OF THE DRAWINGS

The above and other objects, features and other advantages of the present invention will be more clearly understood from the following detailed description when taken in conjunction with the accompanying drawings, in which:

FIG. 2 shows a combined shock data conversion table illustrating the operation of a combined shock data conversion module according to the present invention.

DETAILED DESCRIPTION OF THE INVENTION

Hereinafter, an apparatus for sensing an emergency in response to physical shock and mental shock of a person according to a preferred embodiment of the present invention will be described in detail with reference to the accompanying drawings.

Figure 1:
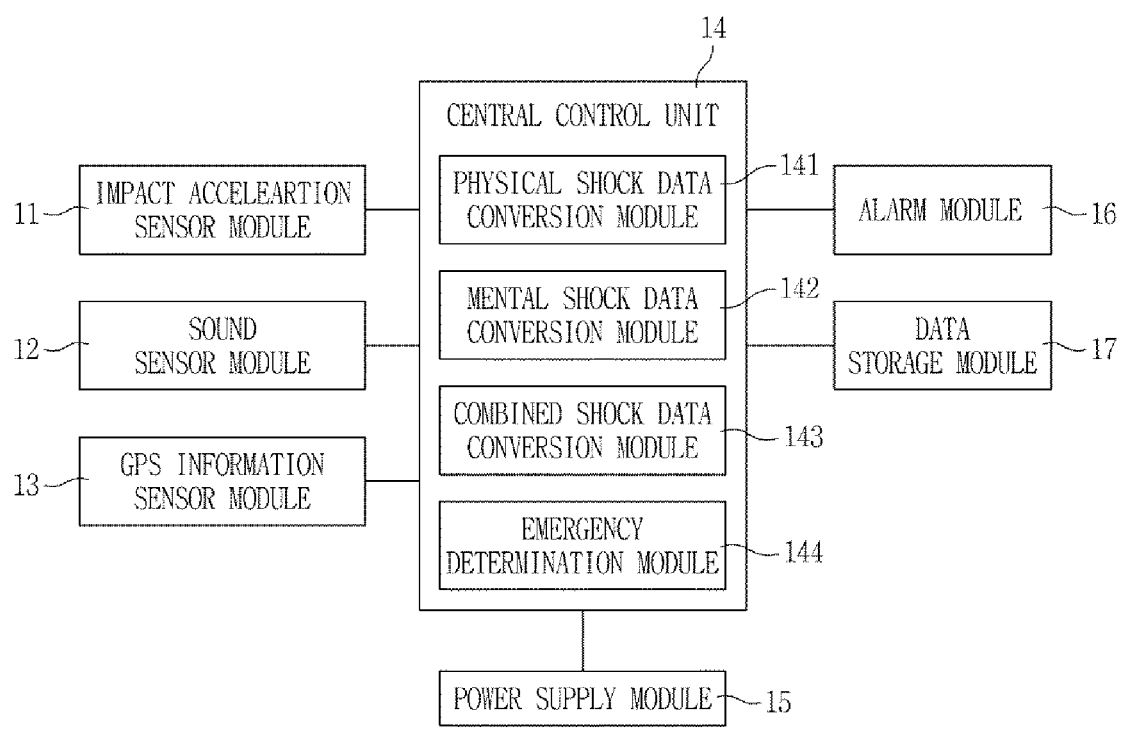
FIG. 1 is a block diagram of an apparatus for sensing an emergency in response to a physical shock and a mental shock according to the present invention.

FIG. 1 is a block diagram schematically illustrating the configuration of an apparatus for sensing an emergency in response to a physical shock and a mental shock of a person according to an embodiment of the present invention.

As illustrated in FIG. 1, the emergency sensing apparatus may include an impact acceleration sensor module 11, a sound sensor module 12, a GPS information sensor module 13, a central control unit 14, a power supply module 15, an alarm module 16, and a data storage module 17.

Here, it is desirable for the emergency sensing apparatus to have a form that can always be carried by a person subject to protection, for example, a form attachable to clothing, a wearable form such as a watch or the like.

The central control unit 14 includes a physical shock data conversion module 141, a mental shock data conversion module 142, a combined shock data conversion module 143, and an emergency determination module 144.

Here, the impact acceleration sensor module 11 of the emergency sensing apparatus is designed in consideration of the size, volume, and weight thereof in order for a user to easily carry the apparatus.

Here, the impact acceleration sensor module 11 measures the degree of physical shock applied to the person who carries the emergency sensing apparatus as impact acceleration. Then, the physical shock data conversion module 141 converts the measured impact acceleration into the actual level of physical shock. Specifically, an impact acceleration more than 30 G may be converted into a shock level corresponding to a large shock such as a fall, an impact acceleration that ranges from 10 G to 30 G may be converted into a shock level corresponding to pushing strongly and instantly, and an impact acceleration less than 1 G may be converted into a shock level corresponding to being nearly motionless.

The sound sensor module 12 of the emergency sensing apparatus receives the sound and voice generated around the person who carries the apparatus. Also, the mental shock data conversion module 142 converts the decibel level of the sound or voice, measured by the sound sensor module 12, into a mental shock level such as a level corresponding to a cry, a level corresponding to a cry of a baby, a level at which sending an SOS is necessary, or the like. Here, the mental shock data conversion module 142 may perform a step in which keywords such as "Oh, my", "Freeze", "Follow me", "Give me the money", and the like, are registered in advance and a step in which whether the caught sound or voice is the same as one of the registered keywords is checked and the sound or voice is converted into a mental shock level.

FIG. 2 is a combined shock data conversion table that specifically shows the operation of the combined shock data conversion module according to an embodiment of the present invention.

The combined shock data conversion module 143 is configured to calculate an actual emergency level by analyzing human reactions to an emergency in conjunction with behavioral science and to operate based on the combined shock data conversion table shown in FIG. 2. Here, the determination of whether or not an emergency exists may differ depending on the physical condition of the person who receives the shock even if the same level of shock is applied. Accordingly, the emergency level may be set differently based on the relationship between a preceding shock and a following shock, the interval therebetween, and the like.

For example, if the current shock is measured as being less than 1 G, it may be regarded as a safe state. However, if the level of a preceding shock is within the range from 4 G to 10 G, which corresponds to fast running, a current shock of less than 1 G may mean that the person has fallen into momentary unconsciousness or cannot move due to a serious injury from the standpoint of human behavioral science. Therefore, this case must be detected as an emergency. Accordingly, from the aspect of behavioral science, criteria for determining whether or not an emergency exists are arranged in the combined shock data conversion table shown in FIG. 2.

Referring to FIG. 2, shocks are categorized into physical shocks and mental shocks, a criterion for an emergency is set, and whether an emergency state continues is checked, whereby whether or not an emergency exists is clearly determined. In other words, the shock that occurred first is set to the preceding emergency factor, the shock that occurred after 30 seconds is set to the following emergency factor, and the continuity of the emergency is checked based on these factors, whereby whether or not an emergency exists may be automatically sensed.

The emergency determination module 144 may perform the step of processing information in which the position information, collected by the GPS information sensor module 13, is represented as text or is marked on a map image in order to improve visibility and readability.

The alarm module 16 may perform the step of sending an emergency signal outside, and may transmit the emergency signal using an external terminal. Also, the alarm module 16 may transmit image data captured using a camera and sound data recorded using a microphone to the external terminal.

The data storage module 17 stores impact acceleration measurements, received from the impact acceleration sensor module 11, the decibel level of sound, received from the sound sensor module 12, the level of physical shock and the time at which the physical shock occurred, received from the physical shock data conversion module 141, the level of mental shock and the time at which the mental shock occurred, received from the mental shock data conversion module 142, a combined shock level, sound data, GPS data, and control data in the apparatus.

An emergency sensing method may be implemented using the above-mentioned apparatus for sensing an emergency.

Figure 3:
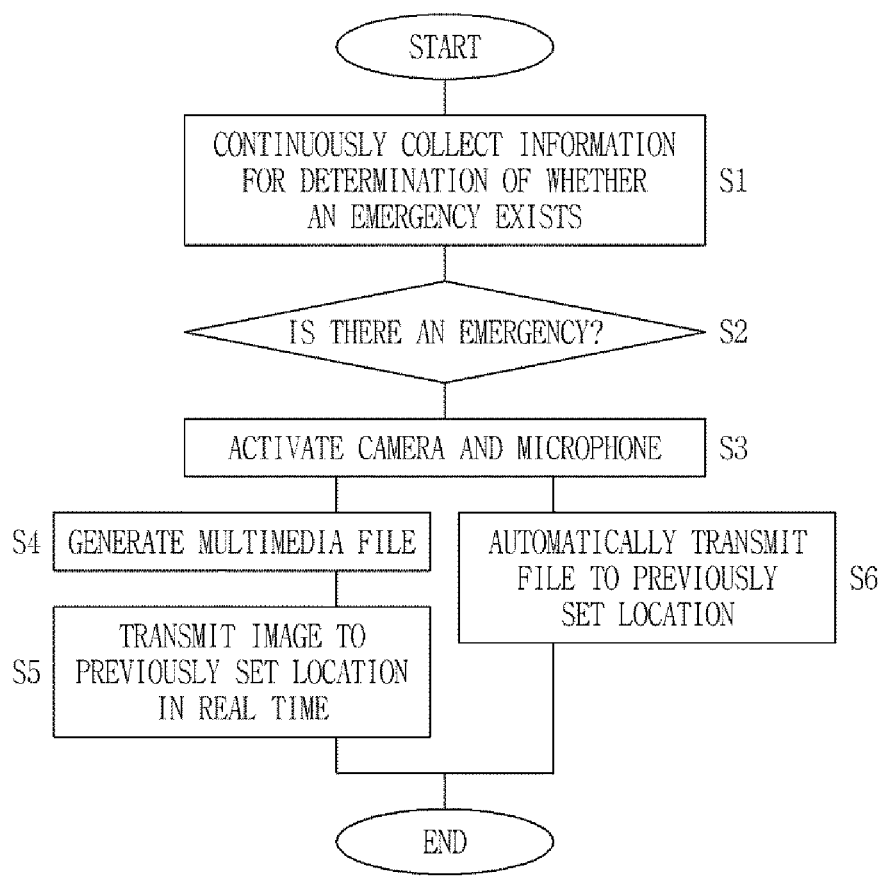
FIG. 3 is a flowchart of an emergency sensing method using an apparatus for sensing an emergency in response to a physical shock and a mental shock according to the present invention.

FIG. 3 is a flowchart illustrating an emergency sensing method using the apparatus for sensing an emergency in response to a physical shock and a mental shock according to the present invention.

First, an information collection step (S1) is performed. In the information collection step (S1), a physical shock level, a mental shock level, and a combined shock level are continuously collected by the physical shock data conversion module, the mental shock data conversion module, and the combined shock data conversion module at regular intervals. Then, in an emergency determination step (S2), if the physical shock level, the mental shock level, or the combined shock level, collected at the information collection step (S1), is equal to or greater than a reference level, it is determined that an emergency exists.

If it is determined that an emergency exists at the emergency determination step (S2), a site checking step (S3) in which a camera and a microphone are activated in order to check the situation at the site, is performed. Then, if a configuration value set in advance is set to transmission of a multimedia file, a file generation step (S4), in which image data are generated from the images captured using the camera and sound data are generated from the sound recorded using the microphone, is performed.

Then, a file transmission step (S5), in which the image data and sound data generated in the file generation step (S4) are transmitted to an external terminal, is performed. Here, if a configuration value set in advance is set to real-time image transmission, a real-time image transmission step (S6), in which video data, captured using the camera and the microphone in the site checking step (S3), are transmitted to the external terminal in real time, is performed.

According to the present invention, when an emergency occurs, the emergency may be automatically sensed without any effort on the part of a victim. Also, because the rate at which an emergency is sensed in real time is increased and whether or not an emergency exists is more correctly determined, the rate of false determination, for example, the case in which an emergency is not sensed or the case in which it is determined that an emergency exists even if there is no emergency, may be reduced. Also, it is possible to immediately respond to the emergency.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. An apparatus for sensing an emergency in response to a physical shock and a mental shock, comprising:
   an impact acceleration sensor module for measuring a level of physical shock applied to a body;
   a physical shock data conversion module for receiving output from the impact acceleration sensor module and converting a level of shock per unit time into the level of physical shock;
   a sound sensor module for receiving sound or voice for measuring a level of mental shock;

a mental shock data conversion module for converting a decibel level of the sound or voice, input from the sound sensor module, into the level of mental shock, or converting the sound or voice into the level of mental shock by checking whether a waveform of the input sound or voice is identical to that of a keyword registered in advance;

a combined shock data conversion module for acquiring a combined shock level by analyzing dynamics including an order in which the physical shock and the mental shock occur, a change in intensity of the physical shock and the mental shock;

an emergency determination module for categorizing one or more of the level of physical shock, the level of mental shock, and the combined shock level into a preceding emergency factor, which corresponds to a level of shock that occurred first, and a following emergency factor, which corresponds to a level of shock that occurred after a preset time period, and determining whether an emergency exists by mapping the preceding emergency factor to the following emergency factor using a preset mapping table;

an alarm module for outputting an emergency signal when the emergency determination module determines that an emergency exists; and a data storage module for storing the level of physical shock, a time at which the physical shock occurred, the level of mental shock, a time at which the mental shock occurred, the combined shock level, sound data, and GPS data.

2. The apparatus of claim 1, wherein the physical shock data conversion module converts a measured impact acceleration into an actual level of physical shock, which is one of a shock level corresponding to a large shock beyond a fall, a shock level corresponding to pushing strongly and instantly, a shock level corresponding to fast running, a shock level corresponding to walking or being dragged, and a shock level in which a degree of movement is equal to or less than a predetermined value.

3. The apparatus of claim 1, wherein the mental shock data conversion module is configured to:

convert the decibel level, measured by the sound sensor module, into the level of mental shock, which is one of a shock level corresponding to a cry, a shock level corresponding to a cry of a baby, or a shock level at which sending an SOS is necessary; and convert the input voice, received from the sound sensor module, into the level of mental shock by checking whether the waveform of the input voice is identical to that of the keyword registered in advance.

4. The apparatus of claim 1, wherein the combined shock data conversion module is configured to:

calculate the combined shock level in order to determine whether an emergency exists, which varies depending on a physical condition of a person who receives the physical shock even if an identical shock is applied; and calculate the combined shock level by analyzing dynamics including the order in which the physical shock and the mental shock occur and the change in the intensity of the physical shock and the mental shock, in conjunction with behavioral science.

5. A method for sensing an emergency in response to a physical shock and a mental shock, which uses an impact acceleration sensor module for measuring a level of physical shock applied to a body, a physical shock data conversion module for receiving output from the impact acceleration sensor module and converting a degree of shock per unit time to a level of physical shock, a sound sensor module for receiving sound or voice for measuring a level of mental shock, a mental shock data conversion module for converting a decibel level of the sound or voice, input from the sound sensor module, into the level of mental shock, or converting the input sound or voice into the level of mental shock by checking whether a waveform of the input sound or voice is identical to that of a keyword registered in advance, a combined shock data conversion module for acquiring a combined shock level by analyzing dynamics including an order in which the physical shock and the mental shock occur, a change in intensity of the physical shock and the mental shock, an emergency determination module for determining whether an emergency exists depending on whether the level of physical shock, the level of mental shock, or the combined shock level is equal to or greater than a reference value, an alarm module for outputting an emergency signal when the emergency determination module determines that an emergency exists, and a data storage module for storing the level of physical shock, a time at which the physical shock occurred, the level of mental shock, a time at which the mental shock occurred, the combined shock level, sound data, and GPS data, the method comprising:

continuously collecting the physical shock level, the mental shock level, and the combined shock level from the physical shock data conversion module, the mental shock data conversion module, and the combined shock data conversion module at regular intervals;

categorizing one or more of the physical shock level, the mental shock level, and the combined shock level into a preceding emergency factor, which corresponds to a level of shock that occurred first, and a following emergency factor, which corresponds to a level of shock that occurred after a preset time period, and determining whether or not an emergency exists by mapping the preceding emergency factor to the following emergency factor using a preset mapping table;

when it is determined that an emergency exists at the determining, activating a camera and a microphone, acquiring images using the camera, and acquiring sound using the microphone in order to check a situation at a site;

generating image data from the images captured by the camera and generating sound data from the sound recorded by the microphone; and transmitting the generated image data and the generated sound data to an external terminal.

* * * * *